United States Patent [19]

Gotterbauer

[11] Patent Number: 5,759,479
[45] Date of Patent: Jun. 2, 1998

[54] PROCESS OF AND AN APPARATUS FOR INJECTION MOLDING HOLLOW-BLOWN PLASTIC BODIES

[75] Inventor: Klaus Gotterbauer, Vilsheim, Germany

[73] Assignee: Eldra Kunststofftechnik GmbH, Vilsbiburg, Germany

[21] Appl. No.: 652,027

[22] Filed: May 21, 1996

[30] Foreign Application Priority Data

May 23, 1995 [DE] Germany ............ 195 18 963.9

[51] Int. Cl.⁶ ............... B29C 45/18; B29D 24/00
[52] U.S. Cl. ................................... 264/572; 425/130
[58] Field of Search ....................... 264/45.1, 241, 264/255, 572; 425/130

[56] References Cited

U.S. PATENT DOCUMENTS

| | | | |
|---|---|---|---|
| 3,873,656 | 3/1975 | Garner | 264/55 |
| 5,069,858 | 12/1991 | Hendry | 264/572 |
| 5,090,886 | 2/1992 | Jaroschek | 264/572 |
| 5,204,050 | 4/1993 | Loren | 264/504 |
| 5,401,459 | 3/1995 | Nichols et al. | 264/572 |
| 5,423,667 | 6/1995 | Jaroschek | 264/572 |
| 5,607,640 | 3/1997 | Hendry | 264/572 |
| 5,612,067 | 3/1997 | Kurihara et al. | 264/572 |

FOREIGN PATENT DOCUMENTS

| | | |
|---|---|---|
| 0043174 A | 1/1982 | European Pat. Off. |
| 0630731 A | 12/1984 | European Pat. Off. |
| 2115488 | 11/1971 | France |
| 3913109 | 10/1990 | Germany |
| 42 35 673 A 1 | 4/1993 | Germany |
| 43 00 397 A 1 | 7/1993 | Germany |
| 42 37 062 C 1 | 2/1994 | Germany |
| 42 30 782 A 1 | 3/1994 | Germany |
| WO 94/08773 | 4/1994 | WIPO |

OTHER PUBLICATIONS

Eyerer et al., "Spritzgiessen mit Gasinnendruck", Kunststoffe, 83, (Jul. 1993), pp. 505–517.

*Primary Examiner*—Catherine Timm
*Attorney, Agent, or Firm*—Fitch, Even, Tabin & Flannery

[57] ABSTRACT

The invention relates to a process of and an apparatus for injection molding hollow-blown plastic bodies in which a mold cavity formed by a tool and consisting of at least one main mold cavity and at least one side mold cavity connected with this is filled with a pressurized flowable plastic melt and, simultaneously or after the setting in of the hardening of the walls in the main mold cavity, a pressurized fluid is introduced into the main mold cavity, as a result of which the flowable core in the main molded cavity is displaced while forming a flow front and, as soon as the flow front has reached the point of connection to the side mold cavity, a pressurized fluid is additionally introduced into the side mold cavity at the side opposite the point of connection such that the molten core in the side mold cavity is forced out together with the molten core in the main mold cavity.

6 Claims, 5 Drawing Sheets

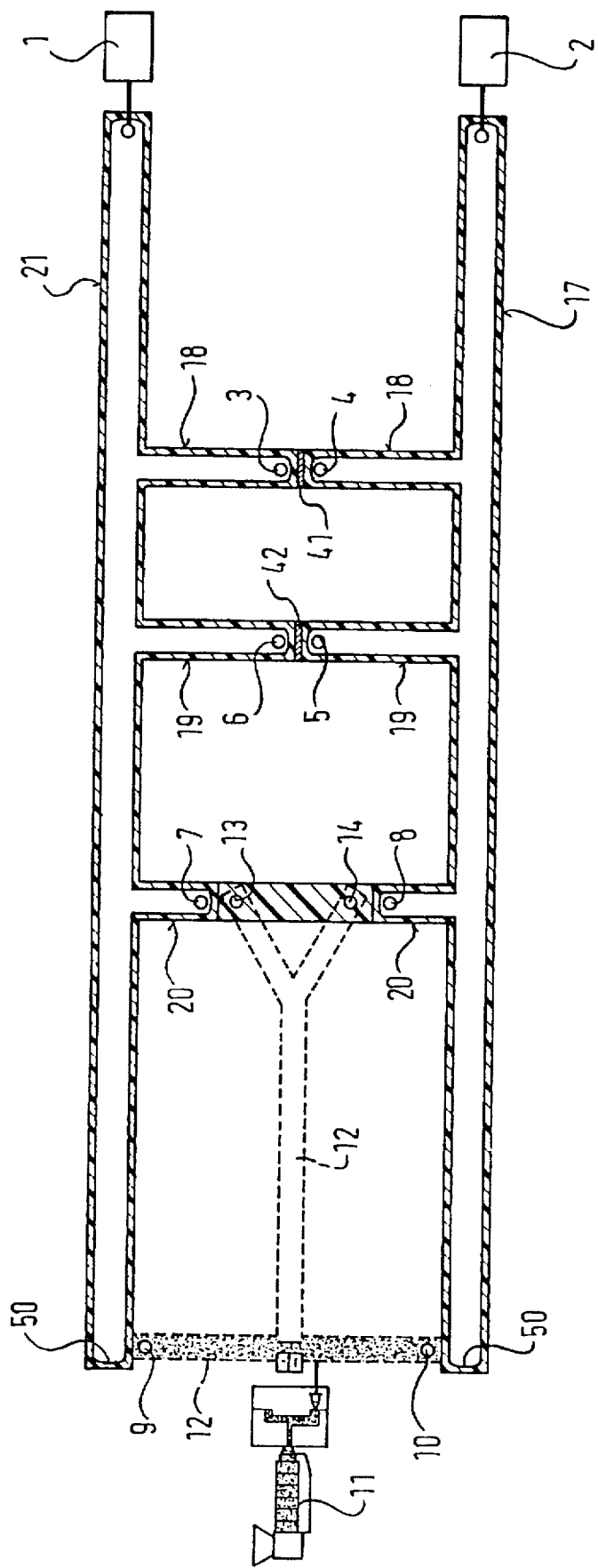

PROCESS OF AND AN APPARATUS FOR INJECTION MOLDING HOLLOW-BLOWN PLASTIC BODIES

BACKGROUND OF THE INVENTION

The invention relates to a process of and an apparatus for injection molding hollow-blown plastic bodies in which the known gas internal pressure technique is used.

With regard to the term gas internal pressure process (GIP process), a process is understood in which a gas, mostly nitrogen, is injected into a mold cavity filled with a plastic melt and the melt is displaced by the gas pressure of approximately 25 to 300 bar, forming a gas channel. In accordance with the publication "Spritzgießen mit Gasinnendruck" (injection molding with gas internal pressure), P. Eyerer, R. Martins, Stuttgart and E. Burkle, Munich, in the journal "Kunststoffe" (Plastics), Carl Hansa Verlag, Munich 1993, one differentiates between a standard gas internal pressure process and a special gas internal pressure process.

In the case of the so-called standard gas internal pressure process, a partial filling of a cavity, that is to say a hollow space in a mold, with plastic melt initially takes place. A gas is introduced as the remaining filling. This means that the cavity is initially partially filled with a precisely defined amount of plastic melt. The volume required for this must be previously determined empirically in order, on the one hand, to prevent the flow front from being blown through by the gas and, on the other hand, to ensure an ideal gas blowing volume. Simultaneously or subsequently, the gas is introduced into the interior of the molded part (plastic core), it being supplied via a sprue and distribution system (comprising a machine nozzle) or with the aid of tool nozzles in the tool. The gas moves the melt out of the plastic core towards the end of the flow path until the rest of the cavity has been completely filled. At which point in time the gas can actually displace the plastic material in the interior of the molded part depends on the physical processes in the nozzle and the molded part.

After the displacement process, the gas pressure acts in the hollow space formed in the molded part as a so-called dwell pressure to compensate contraction until the molded part has cooled to the extent that it can be removed from the mold.

However, before removal from the mold, it is necessary to reduce the gas pressure in the molded part interior because the hollow body will otherwise burst upon opening the tool. This can be done by suitably drawing in the gas and/or relieving the pressure into the surroundings.

In the special GIP process, in contrast to the standard gas internal pressure process, the cavity is completely filled with melt. The so-called mass back-pressing then takes place. Understood under the term mass back-pressing is the pushing back of the plastic core of the melt out of the part being molded and through the so-called displacement nozzles into the plastification unit of the injection molding machine with the aid of gas pressure. Depending on the molded part geometry, the mass dwell pressure acts to compensate contraction of the remaining thin wall thickness. The position of the screw of the plastification unit after the pushing back step is a measure for the length of the gas channel. After the melt has been pushed back and the displacement nozzle has been closed, the gas pressure is increased to compensate contraction and for intensive cooling between the surface of the molded part and the tool wall. Subsequently, similarly as in the standard gas internal pressure process, a drawing in of gas or a release of pressure must be carried out in order to be able to remove the molded part.

Until now, these gas internal pressure processes could only be used for simple molded part geometries. For complicated molded part geometries, it was necessary until now to introduce the material forced out upon displacement of the molten core in a mold cavity into one or more side cavities removable from the molded part and provided in the tool.

A process and an apparatus for injection molding fluid-filled plastic bodies in which the molten core is displaced into a side cavity is known from DE 39 13 109 C2. In this known process, the mold cavity is initially completely filled with plastic melt. After the hardening of the plastic melt at the walls of the mold cavity has set in, the still molten core of the plastic body is displaced by means of a fluid into at least one side cavity arranged outside the mold cavity and connected in a removable manner with this.

In this known process, it is normally necessary to close the side cavity with a slider which is then opened, for example, pneumatically or hydraulically before the introduction of gas and displacement of the melt.

The technical problem forming the basis of the invention consists in providing a process and an apparatus in which none or at least fewer side cavities are required then before, also in the case of complicated molded part geometries with, for example, transverse connections.

SUMMARY OF THE INVENTION

This technical problem is solved by a process for injection molding hollow-blown plastic bodies in which a mold cavity formed by a tool and consisting of at least one main mold cavity and one side mold cavity connected with this is filled with a pressurized flowable plastic melt and, simultaneously or after the setting in of the hardening of the plastic melt at the walls of the mold cavity, a pressurized fluid is introduced into the main mold cavity, on account of which the flowable core in the main mold cavity is displaced while forming a flow front and, consequently, as soon as the flow front has reached the point of connection with the side mold cavity, a pressurized fluid is additionally introduced at the side in the side mold cavity lying opposite the point of connection so that the molten core in the side mold cavity is forced out together with the molten core in the main mold cavity.

The invention is based on the concept of forcing the molten core out of a side mold cavity connected with the main mold cavity by means of a fluid at the time when the flow front in the main mold cavity has reached the point of connection to the side mold cavity. It is possible for the first time by means of the inventive process to entirely do without a removable side cavity for such a side mold cavity or, in the case of complicated geometries, to at least considerably reduce the number of side cavities in that the material of the molten core of the side mold cavity is forced out together with the molten core of the main mold cavity. As a result of the succession in time of the operation of the nozzles for introducing a fluid into the side mold cavities, the side cavities for the side mold cavities and the associated closure mechanisms are not required or reduced in number. Additionally, a smaller and cheaper tool can be produced.

Further, for the first time, there is no or only a small amount of finishing work for a molded part with a complicated geometry which would otherwise be required to remove a side cavity or its neck piece.

By means of the inventive process, it is therefore possible for the first time to also inject complicated molded part geometries having side mold cavities extending from the main mold cavity using the gas internal pressure technique.

Additionally, a saving in gas by volume reduction as well as a saving of material is possible because the entire amount or at least the substantial part of the displaced material of the molten core can be forced out of the main and side mold cavities back into the plastifying unit of the injection molding machine.

Finally, shorter cycle times than those up to now can be achieved for such complicated molded part geometries.

In the inventive process, it is possible in one process step to introduce the pressurized flowable plastic melt together with a pressurized fluid into the main mold cavity.

However, in accordance with the invention, it is also possible in a first process step to initially fill the entire mold cavity, i.e. the main mold cavity and the side mold cavities connected thereto, this with flowable plastic melt and to then feed in the pressurized fluid in a second process step wherein, first the pressurized fluid is introduced into the main mold cavity to displace a flowable core of plastic melt and form a flow front. Then, as soon as the flow front reaches the point of connection with the side mold cavity, a pressurized fluid is additionally introduced at the end of the side mold cavity opposite the point of connection so that the molten core in the side mold cavity is forced out together with the molten core in the main mold cavity. When there are more than one side mold cavities opening into the main mold cavity, pressurized fluid is additionally introduced into each of those side mold cavities as soon as the flow front in the main mold cavity has reached the point of connection of the corresponding side mold cavity.

In principle, the nozzles for supplying the flowable plastic melt and for forcing in the pressurized fluid are respectively arranged in such a manner that an evenly progressing operation of the process adapted to the respective geometry can be realized. For certain geometries, it can be advantageous to arrange the nozzles for supplying the flowable plastic melt at one end of the tool and the nozzles for forcing in the pressurized fluid at the other end of the tool.

If the tool has several main mold cavities extending in a longitudinal direction and side mold cavities arranged at an angle to these, then it is possibly advantageous to arrange partition plates in the middle region of the side mold cavities which subdivide said side mold cavities. As a result, the molten core can be forced out of the side mold cavities into the associated main mold cavity in a deliberate manner.

In such cases, it is advantageous to arrange a nozzle on each side of the partition plate or plates for introducing a pressurized fluid.

BRIEF DESCRIPTION OF THE DRAWINGS

For further explanation and better understanding of the invention, an exemplary embodiment is described and explained in more detail in the following with reference to the enclosed drawings, in which:

FIG. 5 shows a schematic view according to FIG. 1 during a fifth process step.

DESCRIPTION

Figure 1:
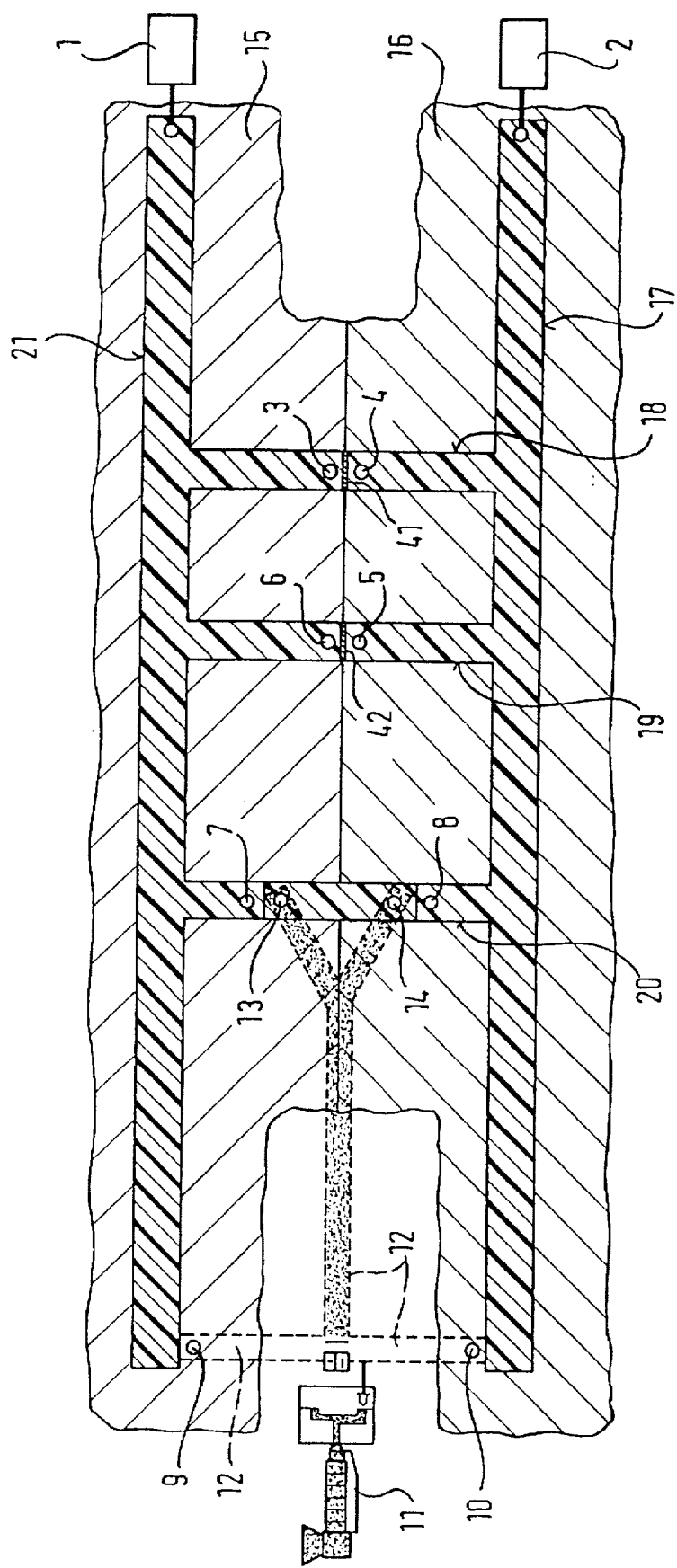
FIG. 1 shows a schematic sectional view of an injection molding tool comprising a main mold cavity and side mold cavities during a first process step.

A schematic cross-sectional view of an injection molding tool is shown in FIG. 1. The schematically illustrated tool consists of a multi-part tool of which only the tool parts 15 and 16 can be recognized. These parts are not illustrated in the further FIGS. 2 to 5 so as to provide a better overview. The tool parts 15, 16 form two longitudinal main mold cavities 17, 21 and side mold cavities 18, 19, 20 extending transverse to these, and all as a whole are called the mold cavity in the following. The main mold cavities 17, 21 extend in a longitudinal direction and are spaced apart from each other. The side mold cavities 18, 19, 20 are respectively connected with the main mold cavities 17, 21.

An injection molding machine 11 having a plastifying unit is connected by means of a hot channel distributor 12 with respectively one end of the main mold cavities 17, 21. Further, the hot channel distributor 12 ends at a first side mold cavity 20. Hot channel nozzles 9, 10, 13 and 14 are arranged at the ends of the hot channel distributor 12.

A gas internal pressure nozzle 1, 2 is respectively arranged at the ends of the main mold cavities 17, 21 opposite the hot channel nozzles 9, 10.

In the central portion of the side mold cavities 18, 19, there are partition plates 41, 42 which subdivide the side mold cavities 18, 19 into two halves which are respectively connected with one main mold cavity 17, 21. On each side of the partition plates 41, 42, there are further gas internal pressure nozzles 3, 4, 5, 6.

There are also further gas internal pressure nozzles 7, 8 arranged in the first side mold cavity 20 in which the hot channel distributor 12 ends.

The production of a molded part according to the inventive process, in this case a central console for a motor vehicle, is described in more detail in the following.

By means of the injection molding machine 11, a pressurized flowable plastic melt is fed through the hot channel distributor system 12 into the mold cavity 17 to 21 formed by the tool 15, 16. This operation takes place until the mold cavity 17 to 21 is completely filled with plastic melt.

Figure 2:
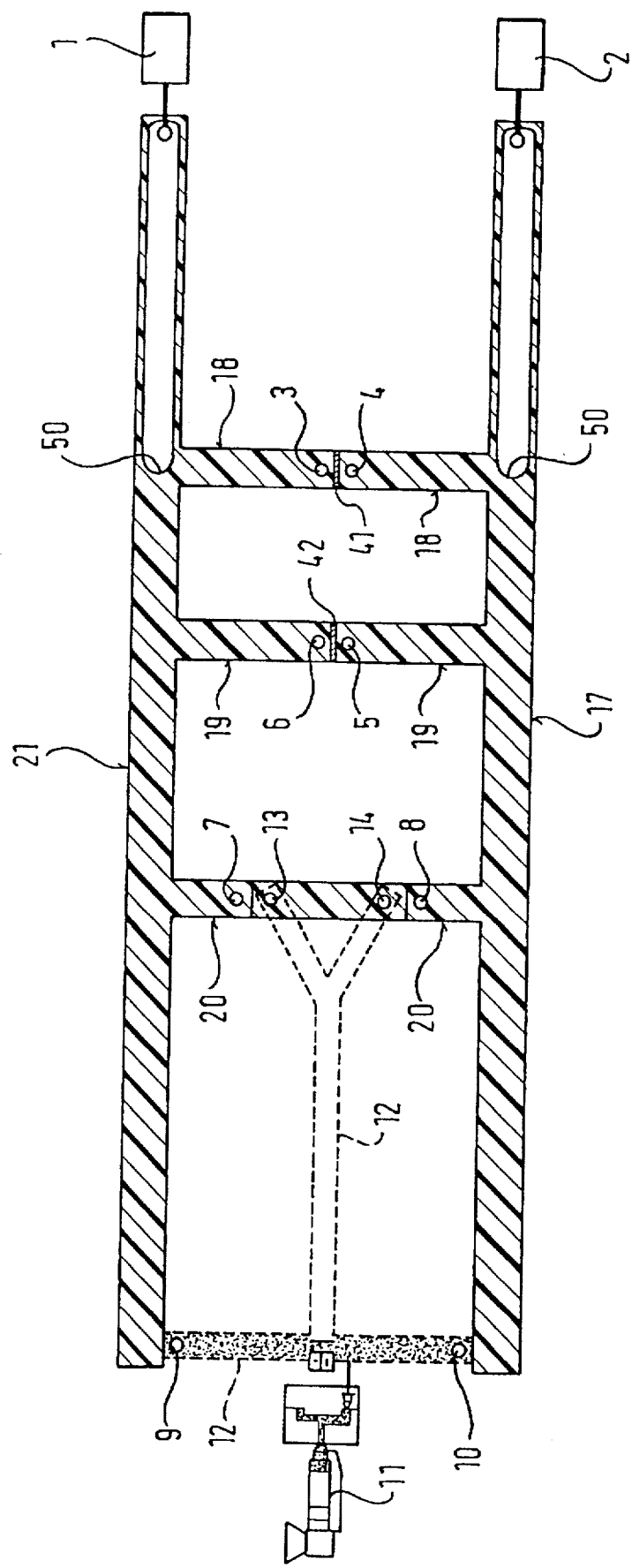
FIG. 2 shows a schematic view according to FIG. 1 during a second process step.

In a second process step according to FIG. 2, after the hardening of the plastic melt at the walls of the mold cavity 17 to 21 has set in, nitrogen is pressed through the gas internal pressure nozzles 1, 2 into the main mold cavity 17, 21, as a result of which the molten core in the main mold cavity 17, 21 is pushed back in the direction of the hot channel distributor 12. This operation lasts until the flow fronts 50 formed by the pressing back of the molten core in the main mold cavity 17, 21 have reached the first side mold cavity 18. During this forcing back of the molten core in the main mold cavity 17, 21, the displaced material is pushed back into the plastifying unit through the hot channel nozzles 9, 10.

Figure 3:
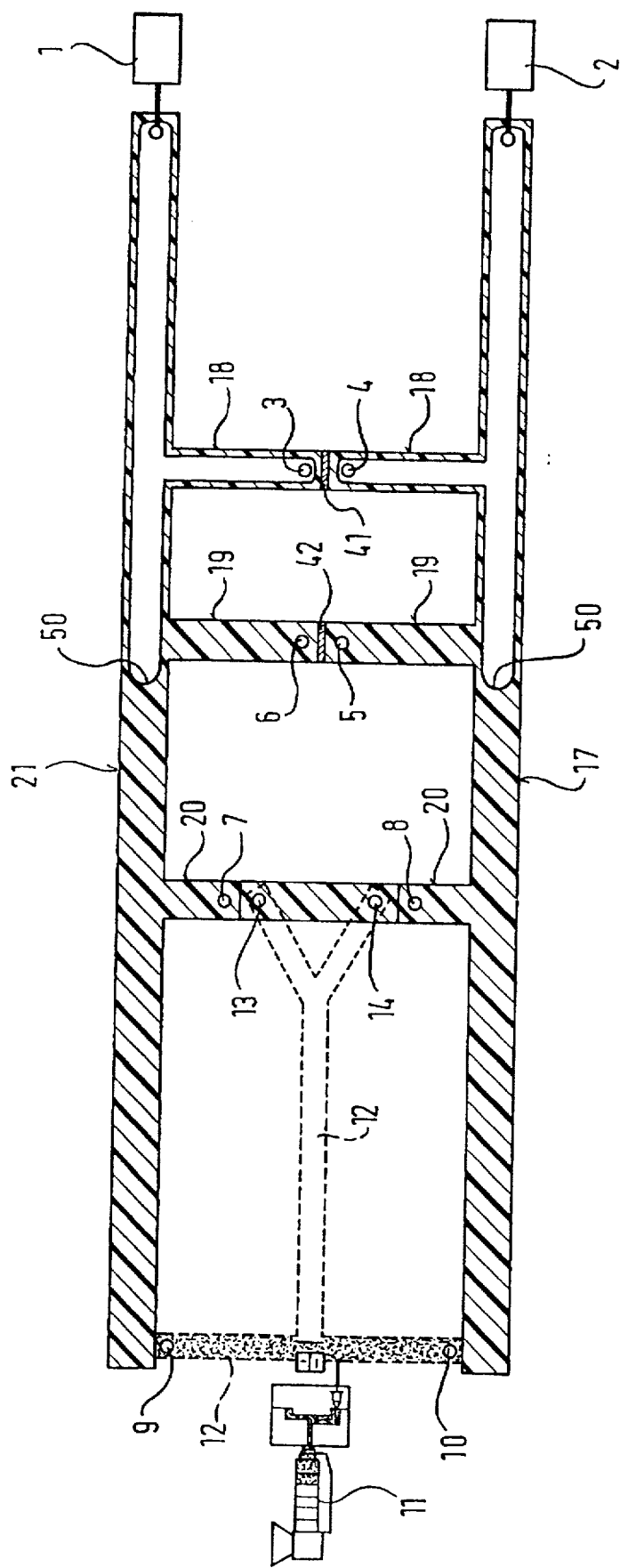
FIG. 3 shows a schematic view according to FIG. 1 during a third process step.

In a third process step as shown in FIG. 3, the gas internal pressure nozzles 3, 4 are additionally pressurized, i.e. a fluid is pressed into the partial area of the first side mold cavity 18, as a result of which the molten core is forced out of the side mold cavity 18 into the main mold cavity 17, 21 and then forced back together in the main mold cavity 17, 21 in the direction of the hot channel nozzles 9, 10, the excess material still flowing back into the plastifying unit.

Figure 4:
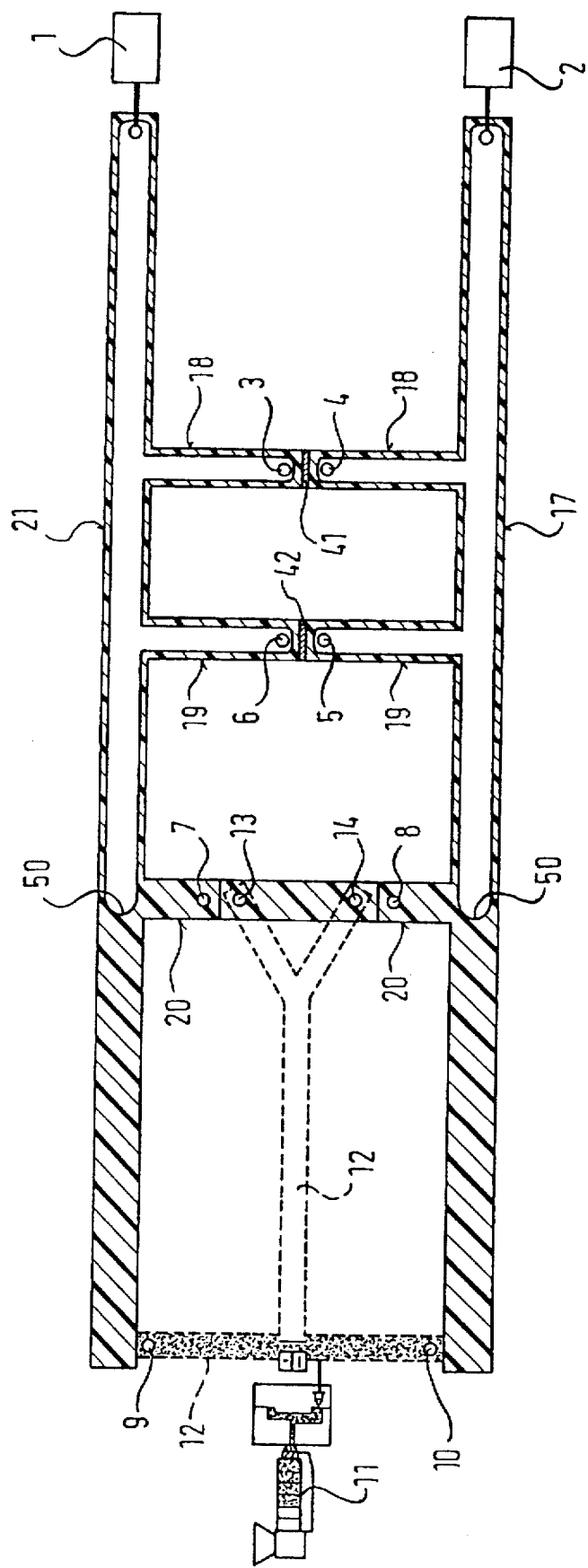
FIG. 4 shows a schematic view according to FIG. 1 during a fourth process step.

This process is repeated in accordance with FIGS. 4 and 5 so that the side mold cavities 19, 20 are also blown hollow as a result of the subsequent pressing of fluid into the gas internal pressure nozzles 5 and 6 and 7 and 8, respectively. These nozzles 5 to 8 are also operated respectively in addition to the gas internal pressure nozzles 1 and 2 when the flow fronts 50 in the main mold cavity 17, 21 have reached the points of connection of the side mold cavities 19, 20 to the main mold cavity 17, 21. The excess material is then also respectively pushed back into the plastifying unit.

After the side mold cavities 18, 19, 20 and main mold cavities 17, 21 have been blown such that they are completely hollow, the gas pressure acts through the cavities formed in this manner in the entire molded hollow of the molded part as a dwell pressure to compensate contraction until the molded part has sufficiently cooled and can be removed. Before removal, however, it is necessary to reduce the gas pressure in the interior of the molded part because the hollow body would otherwise burst on opening the tool. This can be done by a suitably drawing in the gas and/or releasing the gas into the atmosphere. The release of gas or the drawing-in of gas and the removal of the molded part occurs in a known manner according to the state of the art.

I claim:

1. A process of injection molding hollow-blown plastic bodies, the process comprising:

filling a mold cavity with a pressurized flowable plastic melt, said mold cavity comprising at least one main mold cavity and at least one side mold cavity connected to the main mold cavity;

introducing a pressurized fluid into the main mold cavity either simultaneously or after setting in of hardening of the plastic melt at mold walls defining the mold cavity, the pressurized fluid effective for displacing a flowable core in the main mold cavity while forming a flow front; and introducing a pressurized fluid into the side mold cavity when the flow front reaches a point of connection between the side mold cavity and main mold cavity, the pressurized fluid being introduced into the side mold cavity at a point opposite the point of connection between the side mold cavity and main mold cavity, the pressurized fluid effective for displacing a flowable core from the side mold cavity and allowing the flowable core from the side mold cavity and main mold cavity to flow out of the mold cavity together.

2. A process according to claim 1, wherein more than one side mold cavity opens into the at least one main mold cavity, and a pressurized fluid is then additionally introduced into each of the side mold cavities as soon as the flow front in the main mold cavity has reached the point of connection to the side mold cavities.

3. A process according to claim 1, wherein the material displaced by the introduction of the fluid is forced back into a plastifying unit of an injection molding machine.

4. A process according to claim 1, wherein the material displaced by the introduction of the fluid is forced out into a removable side cavity.

5. A process according to claim 2, wherein the material displaced by the introduction of the fluid is forced back into a plastifying unit of an injection molding machine.

6. A process according to claim 2, wherein the material displaced by the introduction of the fluid is forced out into a removable side cavity.

* * * * *